US010841479B2

(12) United States Patent
Yokozeki

(10) Patent No.: US 10,841,479 B2
(45) Date of Patent: Nov. 17, 2020

(54) OPERATION APPARATUS, SYSTEM, AND IMAGE PICKUP APPARATUS

(71) Applicant: CANON KABUSHIKI KAISHA, Tokyo (JP)

(72) Inventor: Chinami Yokozeki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 63 days.

(21) Appl. No.: 16/149,929

(22) Filed: Oct. 2, 2018

(65) Prior Publication Data
US 2019/0109978 A1 Apr. 11, 2019

(30) Foreign Application Priority Data
Oct. 5, 2017 (JP) .................... 2017-195483

(51) Int. Cl.
*H04N 5/232* (2006.01)
*H04N 5/225* (2006.01)

(52) U.S. Cl.
CPC ..... *H04N 5/23212* (2013.01); *H04N 5/22525* (2018.08)

(58) Field of Classification Search
CPC ........ F16M 13/04; F16M 11/18; F16M 11/12; G03B 17/561; G03B 29/00; G02B 7/005; G02B 7/023; G05D 3/20; B60R 2300/10; B66F 11/048; G06F 1/1605; G06F 1/1607; G08B 13/1963; G08B 13/19623; G08B 13/19632; H04N 5/2251; H04N 5/22525; H04N 5/225251; H04N 5/23299; H04N 5/232939; H04N 5/232; H04N 5/23293; G03F 7/70825

USPC .......................................... 348/373
See application file for complete search history.

(56) References Cited

U.S. PATENT DOCUMENTS

| | | | | |
|---|---|---|---|---|
| 5,153,716 A * | 10/1992 | Smith | ................. | G03B 37/02 348/39 |
| 5,801,774 A * | 9/1998 | Seo | ................. | H04N 5/23293 348/333.06 |
| 5,884,107 A * | 3/1999 | Yajima | ................. | G02B 7/102 348/240.3 |
| 5,963,749 A * | 10/1999 | Nicholson | ............ | F16M 11/105 396/421 |
| 5,982,429 A * | 11/1999 | Kamamoto | ........ | H04N 5/23293 348/333.06 |
| 6,707,501 B1 * | 3/2004 | McKay | ................. | G02B 7/10 348/240.3 |
| 7,471,892 B2 * | 12/2008 | Spaulding | ............. | B21J 15/28 396/429 |

(Continued)

FOREIGN PATENT DOCUMENTS

JP 2002287007 A 10/2002

*Primary Examiner* — Chiawei Chen
(74) *Attorney, Agent, or Firm* — Canon U.S.A., Inc. IP Division

(57) ABSTRACT

An operation apparatus has an operation member and generates a command for controlling driving of a movable optical member in a lens apparatus based on an operation amount of the operation member. The operation apparatus includes a display configured to display information, and a processor configured to specify location of the operation apparatus relative to the lens apparatus. The processor is configured to cause the display to perform display with an orientation corresponding to the specified location.

16 Claims, 6 Drawing Sheets

(56) References Cited

U.S. PATENT DOCUMENTS

| | | | |
|---|---|---|---|
| 7,885,537 B1* | 2/2011 | Kuss | H04N 5/23293 348/333.06 |
| 8,040,422 B2* | 10/2011 | Takeuchi | G03B 13/02 348/333.06 |
| 8,368,797 B2* | 2/2013 | Kaji | G03B 13/02 348/333.06 |
| 10,348,166 B2* | 7/2019 | David | H02K 5/15 |
| 2004/0004667 A1* | 1/2004 | Morikawa | H04N 5/2251 348/333.06 |
| 2004/0113033 A1* | 6/2004 | Johnson | F16M 11/041 248/183.3 |
| 2007/0071435 A1* | 3/2007 | Moriya | H04N 5/2251 396/131 |
| 2007/0109418 A1* | 5/2007 | Idemura | H04N 5/23206 348/211.99 |
| 2007/0212048 A1* | 9/2007 | Morimoto | G03B 17/00 396/85 |
| 2008/0049135 A1* | 2/2008 | Okudaira | H04N 5/2251 348/333.06 |
| 2009/0075692 A1* | 3/2009 | Park | H04M 1/0233 455/556.1 |
| 2009/0168353 A1* | 7/2009 | Kato | H04N 5/2252 361/697 |
| 2014/0125829 A1* | 5/2014 | Hashiguchi | H04N 5/23203 348/211.99 |
| 2014/0320671 A1* | 10/2014 | Furihata | H04N 5/262 348/184 |
| 2015/0148594 A1* | 5/2015 | Tadano | A61B 1/00149 600/102 |
| 2015/0160538 A1* | 6/2015 | Hsu | G03B 21/2053 353/85 |
| 2015/0189150 A1* | 7/2015 | Morisawa | G03B 17/38 348/211.8 |
| 2015/0261070 A1* | 9/2015 | Feng | G03B 17/561 396/421 |
| 2016/0091139 A1* | 3/2016 | Levine | G03B 17/563 294/139 |
| 2016/0261782 A1* | 9/2016 | Li | H04N 5/232 |
| 2017/0020627 A1* | 1/2017 | Tesar | A61B 90/20 |
| 2017/0301230 A1* | 10/2017 | Liu | G03B 17/561 |
| 2018/0160025 A1* | 6/2018 | Pallanti | H04N 7/18 |
| 2018/0191959 A1* | 7/2018 | Neufeldt | G03B 17/561 |
| 2018/0227499 A1* | 8/2018 | Lee | H04N 7/183 |
| 2018/0275493 A1* | 9/2018 | Hirota | G03B 17/563 |
| 2019/0098191 A1* | 3/2019 | Enke | H04N 5/23258 |
| 2019/0258143 A1* | 8/2019 | Zhou | H04N 5/23296 |
| 2019/0289285 A1* | 9/2019 | Nashida | H04N 9/3147 |
| 2019/0349533 A1* | 11/2019 | Guo | F16M 11/10 |

* cited by examiner

OPERATION APPARATUS, SYSTEM, AND IMAGE PICKUP APPARATUS

BACKGROUND

Field of the Disclosure

The present disclosure relates to an operation apparatus, a system, and an image pickup apparatus.

Description of the Related Art

An operation apparatus called a focus demand is sometimes used for focusing of a broadcast lens apparatus for, for example. This operation apparatus is set on either one of right and left pan handles of a tripod when being used. Therefore, as illustrated in FIG. 5, the object distance change direction property of an operation of an operation knob (the relation between an operation direction and a change direction of an object distance) can be changed. This operation apparatus is provided with a display unit (display) to improve operability of the operation apparatus. The display unit allows a user to check information, such as a focus driving status, a function setting status of a demand main body, and a function setting status of an image pickup apparatus.

Japanese Patent Application Laid-Open No. 2002-287007 discusses a distance display unit for obtaining a focus instruction position transmitted from a focus demand to a lens apparatus, and displaying an object distance corresponding to the focus instruction position.

In a case where the operation apparatus having the display unit is set on either one of the right and left pan handles of the tripod, display by the display unit may be upside down, which can cause a problem in viewability. A method for changing display to the upright orientation on the display unit by an operation of a switch may be adopted, but this method requires space and cost for disposing the switch.

SUMMARY

According to an aspect of the present disclosure, an operation apparatus that has an operation member and generates a command for controlling driving of a movable optical member in a lens apparatus based on an operation amount of the operation member, includes a display configured to display information, and a processor configured to specify location of the operation apparatus relative to the lens apparatus. The processor is configured to cause the display to perform display with an orientation corresponding to the specified location.

Further features of the present disclosure will become apparent from the following description of exemplary embodiments with reference to the attached drawings.

DESCRIPTION OF THE EMBODIMENTS

Exemplary embodiments of the present disclosure will be described below with reference to the attached drawings. In principle (unless otherwise specified), identical members are provided with identical signs and redundant description thereof will be avoided, for all the drawings illustrating the exemplary embodiments.

Figure 1:
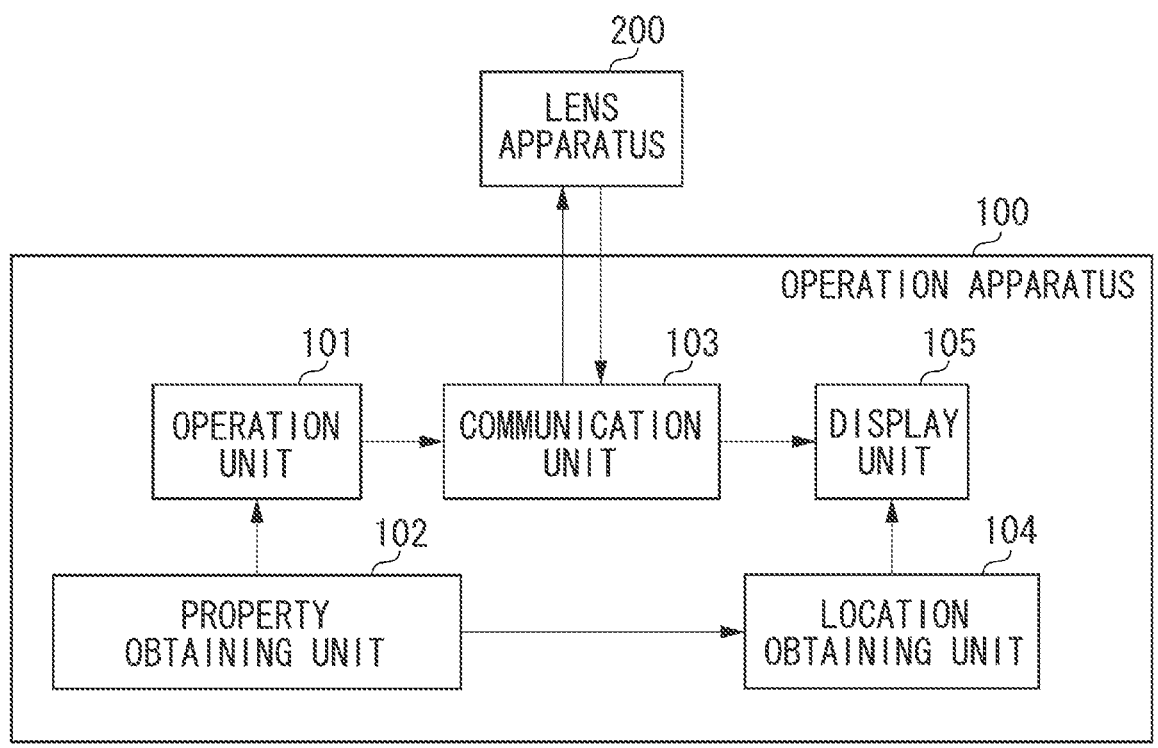
FIG. 1 is a diagram illustrating a configuration example of an operation apparatus according to one or more aspects of the present disclosure.

A first exemplary embodiment will be described with reference to FIG. 1 and FIG. 2. FIG. 1 is a diagram illustrating a configuration example of an operation apparatus according to the first exemplary embodiment. FIG. 1 illustrates an operation apparatus 100 and a lens apparatus 200. The operation apparatus 100 includes an operation unit 101, a property obtaining unit 102, a communication unit 103, a location obtaining unit 104, and a display unit 105 (display). The operation unit 101 includes an operation member (e.g., an operation knob) to be operated by an operator. Here, the property obtaining unit 102, the communication unit 103, and the location obtaining unit 104 can be included in a processor. The processor can be configured of, for example, a single central processing unit (CPU) or a plurality of CPUs, but is not limited thereto. The operation apparatus 100 generates a command for controlling driving of a movable optical member (an optical member 200a to be described below) in the lens apparatus 200 by using the operation unit 101, based on an operation amount of an operation of the operation member by the operator. The command may be the operation amount itself, or may be a value obtained as an output of a predetermined function that uses the operation amount as an input (by converting the operation amount). The communication unit 103 is connected to (a communication unit of) the lens apparatus 200. The communication unit 103 can transmit a command generated by the operation unit 101 to the lens apparatus 200, and receive information such as information about the driving of the movable optical member 200a (e.g., information of a position of the optical member 200a) from the lens apparatus 200. The display unit 105 can display information such as the information about the driving (including information generated in the operation apparatus 100, and information received (obtained) from the lens apparatus 200.

Figure 5:
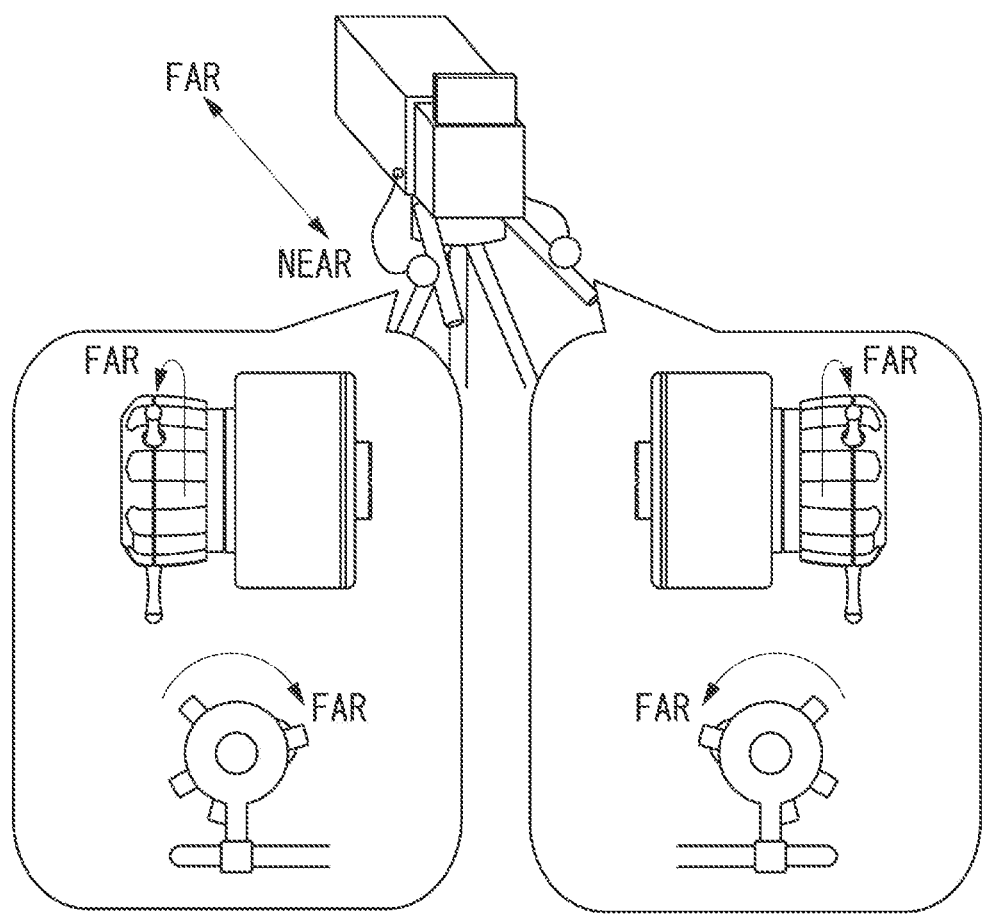
FIG. 5 is a diagram illustrating an example of a relative relation between operations.

The property obtaining unit 102 obtains information about the object distance change direction property of an operation of the operation member (a relative relation between the direction of an operation of the operation member and the direction of driving of the optical member). FIG. 5 is a diagram illustrating an example of a relative relation between the operations. For example, in a case where the movable optical member is a focus lens, one relative relation (a first relative relation) is such a relation that if the operation direction is a clockwise (CW) direction, the driving direction is such a direction that an object distance is directed toward infinity (a FAR direction in FIG. 5). In this case, if the operation direction is a counterclockwise (CCW) direction, the driving direction is such a direction that the object distance is directed toward a close point (a NEAR direction in FIG. 5). The other relative relation (a second relative relation) is such a relation that the operation direction and the driving direction are reversed as compared with the above-described relation. To obtain information of the relative relation, the operation direction can be obtained from the operation unit 101 of the operation member currently operated, and the driving direction corresponding to the operation direction can be obtained from the lens apparatus 200. Alternatively, the information of the relative relation can be stored beforehand in a storage unit included in the operation unit 101, and can be obtained from the storage unit.

The location obtaining unit 104 performs obtaining (specifying) of location of the operation apparatus 100 for the lens apparatus 200, based on the relative relation information obtained by the property obtaining unit 102. The location obtaining unit 104 then causes the display unit 105 to perform display, with an orientation corresponding to the location obtained by the specifying. For example, the location obtaining unit 104 causes the display unit 105 to perform display, such that the display on the display unit 105 is not upside down (is upright) in the location obtained by the specifying, when viewed from the operator (see FIG. 6).

Figure 2:
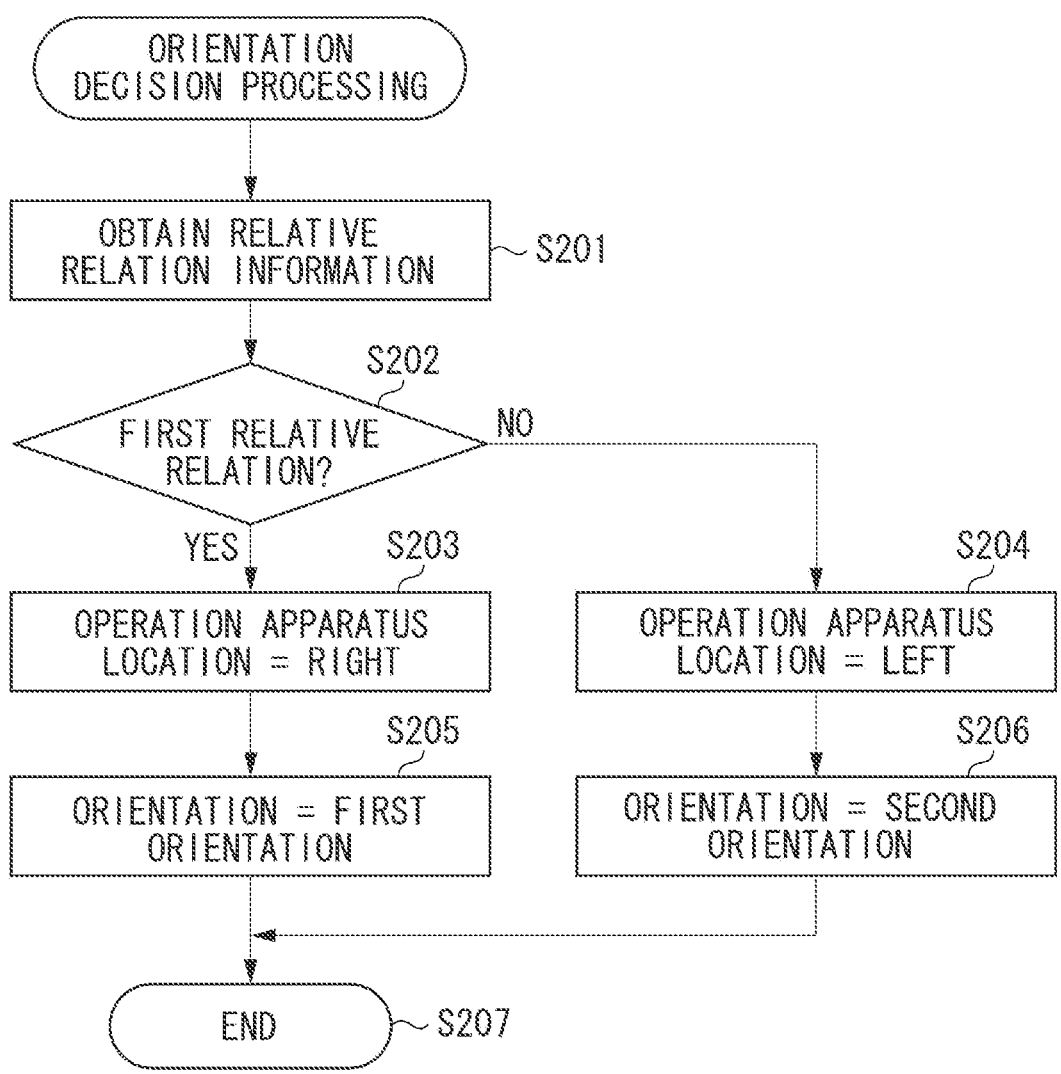
FIG. 2 is a flowchart illustrating an example of a processing procedure for determining a display orientation on a display.

Here, FIG. 2 is a diagram illustrating an example of a flow of processing for deciding an orientation of display performed by the display. The processor of the operation apparatus 100 can perform this processing, according to a computer program stored in the processor. The example of the processing procedure will be described with reference to FIG. 2. First, in step S201, the property obtaining unit 102 obtains predetermined information of the relative relation of the operation unit 101. The obtaining of this relative relation information can be performed in the manner described above. In step S202, the location obtaining unit 104 determines whether the relative relation information obtained by the property obtaining unit 102 is the "first relative relation". In a case where the determination result is the "first relative relation" (YES in step S202), the processing proceeds to step S203. In a case where the determination result is the "second relative relation", i.e., not the "first relative relation" (NO in step S202, the processing proceeds to step S204.

In step S203, the location obtaining unit 104 obtains the location of the operation apparatus 100 as "right". Here, the "right" means that, between right and left pan handles of a tripod, the right pan handle is a handle where the operation apparatus 100 is disposed. Then, the processing proceeds to step S205. In step S204, the location obtaining unit 104 obtains the location of the operation apparatus 100 as "left". Here, the "left" means that, between the right and left pan handles of the tripod, the left pan handle is a handle where the operation apparatus 100 is disposed. Then, the processing proceeds to step S206.

In step S205, the location obtaining unit 104 causes the display unit 105 to perform the display with a "first orientation" or "first sense" corresponding to the location "right". The "orientation" is a set or determined "orientation" and can be merely referred to as "orientation", Here, the "first orientation" is, for example, such an orientation that the display performed by the display unit 105 is not upside down (is upright) in the location "right". Then, in step S207, the processing ends. In step S206, the location obtaining unit 104 causes the display unit 105 to perform the display with a "second orientation" corresponding to the location "left". Here, the "second orientation" is, for example, such an orientation that the display performed by the display unit 105 is not upside down (is upright) in the location "left". Then, in step S207, the processing ends.

By the above-described processing, based on the relative relation of the operation of the operation unit 101, the location of the operation apparatus 100 can be specified, and the display unit 105 can be caused to perform the display with an orientation corresponding to the location obtained by the specifying. This orientation is, for example, such an orientation that the display is not upside down (is upright) when viewed from the operator, regardless of whether the location is the "right" or the "left" (see FIG. 6). According to the present exemplary embodiment, space and cost for adding a component, such as a switch and a sensor, when setting (changing) of the orientation of the operation apparatus 100 is performed. Therefore, for example, an operation apparatus advantageous in setting of an orientation of the display on the display unit can be provided.

The focus demand (the operation apparatus for operating the lens unit for focusing, as the movable optical member in the lens apparatus) is described above, as an example of the operation apparatus. However, the operation apparatus is not limited to this example, and may be any type of apparatus in which the relative relation between operations varies depending on the location. For example, the operation apparatus can be an apparatus (a zoom demand) for operating a lens unit for zooming, or an apparatus for operating an aperture. Further, the orientation of the display is not limited to such an orientation that the display is not upside down (is upright) when viewed from the operator. The orientation of the display can be an orientation advantageous in terms of visibility of the operator. Furthermore, the operation apparatus can be configured to select enabling/disabling of the function for changing the orientation of the display described above, by using, for example, software. In that case, the orientation of the display can be a predetermined orientation based on an input of the operator, instead of being the orientation corresponding to the location obtained by the specifying.

Figure 3:
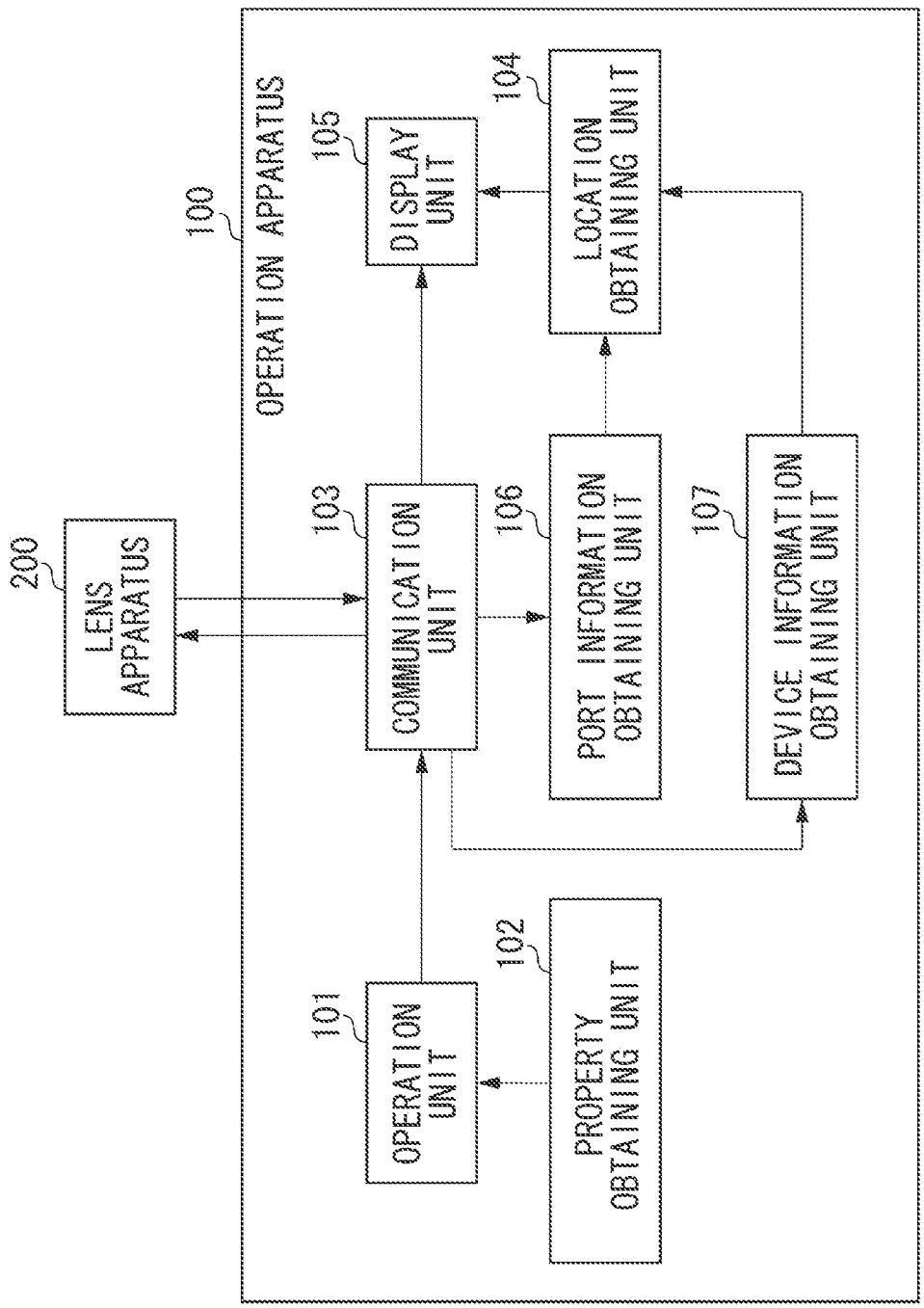
FIG. 3 is a diagram illustrating a configuration example of an operation apparatus according to one or more aspects of the present disclosure.

A second exemplary embodiment will be described with reference to FIG. 3 and FIG. 4. FIG. 3 is a diagram illustrating a configuration example of an operation apparatus according to the second exemplary embodiment. This configuration example is different from the configuration example according to the first exemplary embodiment, in that a port information obtaining unit 106 and a device information obtaining unit 107 are further included. The property obtaining unit 102 can be omitted. In the configuration example according to the second exemplary embodiment, as for a portion common to the configuration example according to the first exemplary of embodiment, a configuration similar to the configuration example according to the first exemplary embodiment can be provided.

The port information obtaining unit 106 obtains port information from the lens apparatus 200 via the communication unit 103. The port information indicates a correspondence between a communication connector (may be simply referred to as a connector) of the lens apparatus 200 and a port assigned to the connector. The port information obtaining unit 106 outputs (transmits) the obtained port information to the location obtaining unit 104. The device information obtaining unit 107 obtains device information from the lens apparatus 200 via the communication unit 103. The device information indicates a device (a device including the operation apparatus 100) connected to a port of the lens apparatus 200. The device information obtaining unit 107 outputs (transmits) the obtained device information to the location obtaining unit 104.

Based on the port information obtained from the port information obtaining unit 106 and the device information obtained from the device information obtaining unit 107, the location obtaining unit 104 obtains information of the connector of the lens apparatus to which the operation apparatus 100 is connected. The location obtaining unit 104 then obtains the location of the operation apparatus 100, based on the obtained information of the connector. Information indicating the obtained location of the operation apparatus 100 may be output (transmitted) to the display unit 105, and displayed on the display unit 105. The location obtaining unit 104 causes the display unit 105 to perform display with an orientation corresponding to the obtained location.

Figure 4:
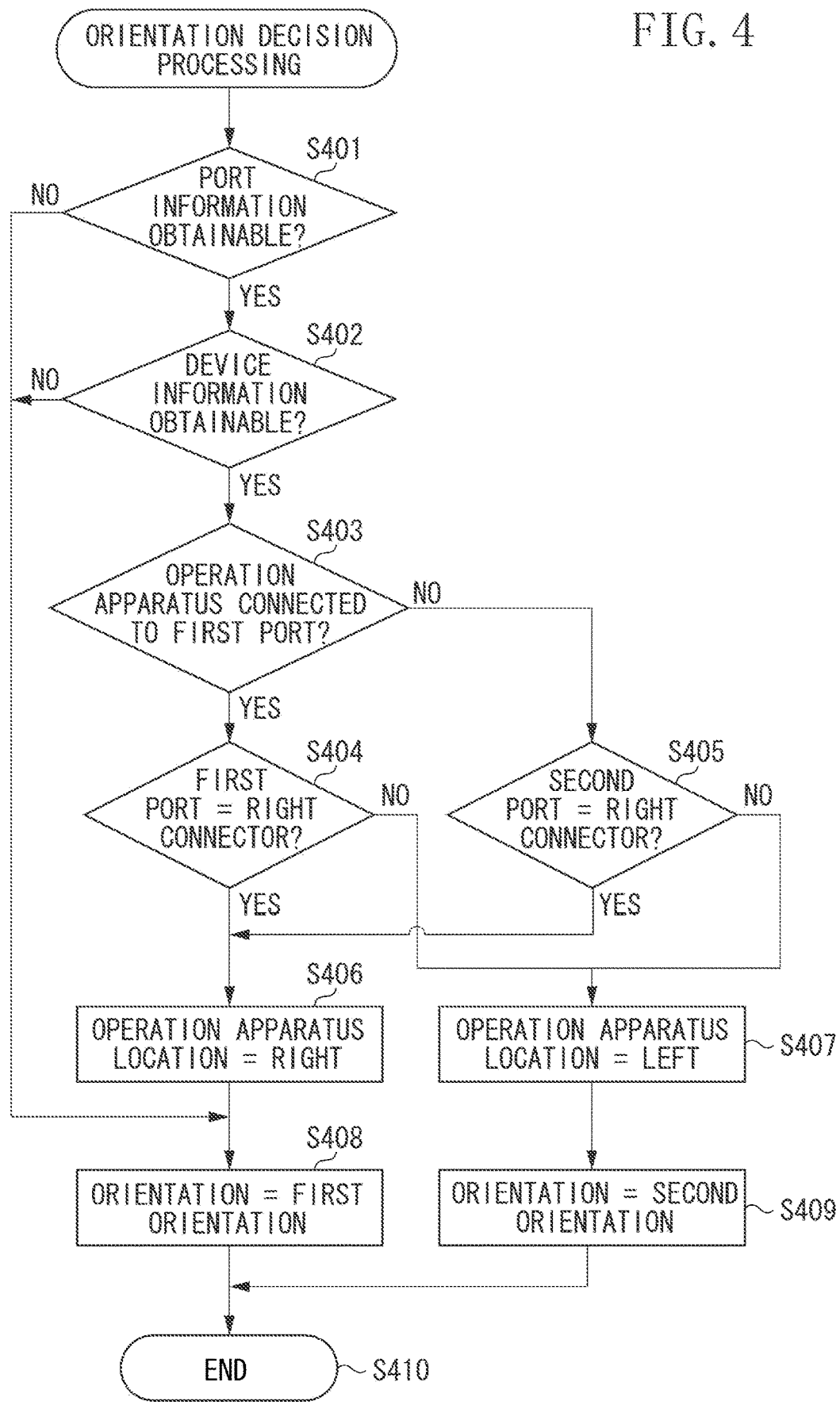
FIG. 4 is a flowchart illustrating another example of a processing procedure for determining a display orientation on a display.

Here, FIG. 4 is a diagram illustrating another example of a flow of processing for deciding an orientation of display on the display. The processor of the operation apparatus 100 can perform this processing, according to a computer program stored in the processor. The example of the flow of the processing will be described with reference to FIG. 4. First, in step S401, the port information obtaining unit 106 determines whether port information such as the above-described port information can be obtained from the lens apparatus 200, in a case where the determination result is "obtainable" (YES in step S401), the processing proceeds to step S402. In a case where the determination result is "unobtainable" (NO in step S401), the processing proceeds to step S408. In step S402, the device information obtaining unit 107 determines whether device information such as the above-described device information can be obtained from the lens apparatus 200. In a case where the determination result is "obtainable" (YES in step S402), the processing proceeds to step S403. In a case where the determination result is "unobtainable" (NO in step S402), the processing proceeds to step S408.

In step S403, based on the device information obtained from the lens apparatus 200, the location obtaining unit 104 determines whether the operation apparatus 100 is connected to a first port. In a case where the operation apparatus 100 is connected to a first port (YES in step S403), the processing proceeds to step S404. In a case where the operation apparatus 100 is not connected to a first port (NO in step S403), in a case where the operation apparatus 100 is connected to a second port, the processing proceeds to step 405. In step S404, based on the port information obtained from the lens apparatus 200, the location obtaining unit 104 determines whether the "first port" is the "right connector". In a case where the "first port" is the "right connector" (YES in step S404), the processing proceeds to step S406. In a case where the "first port" is not the "right connector" (NC) in step S404), i.e., the "first port" is the "left connector", the processing proceeds to step S407. In step S405, based on the port information obtained from the lens apparatus 200, the location obtaining unit 104 determines whether the "second port" is the "right connector". In a case where the "second port" is the "right connector" (YES in step S405), the processing proceeds to step S406, In a case where the "second port" is the "right connector" (NO in step S405), i.e., in a case where the "second port" is the "left connector", the processing proceeds to step S407.

In step S406, the location obtaining unit 104 determines the location of the operation apparatus 100 as the "right". Then, the processing proceeds to step S408. In step S407, the location obtaining unit 104 determines the location of the operation apparatus 100 as the "left". Then, the processing proceeds to step S409. In step S408, the location obtaining unit 104 causes the display unit 105 to perform display with the "first orientation" corresponding to the location "right". Here, for example, the "first orientation" is such an orientation that the display on the display unit 105 is not upside down (is upright) in the location "right". Then, in step S410, the processing ends. In step S409, the location obtaining unit 104 causes the display unit 105 to perform display in the "second orientation" corresponding to the location "left". Here, for example, the "second orientation" is such an orientation that the display on the display unit 105 is not upside down (is upright) in the location "left". Then, in step S410, the processing ends.

Assume that, for example, the operation apparatus 100 is connected to the right connector of the lens apparatus 200 for which "left connector=port 1" and "right connector=port 2" are set. In this case, the device information obtaining unit 107 obtains information indicating that an operation apparatus connected to the "port 2" is the operation apparatus 100. Further, the port information obtaining unit 106 obtains information indicating "right connector=port 2". From these pieces of information, it is possible to recognize that a connector to which the operation apparatus 100 is connected is the right connector. In that case, the location obtaining unit 104 can obtain information indicating "location of the operation apparatus 100=right".

By the above-described processing, based on the port information and the device information obtained from the lens apparatus 200, the location of the operation apparatus 100 can be specified, and the display unit 105 can be caused to perform the display with an orientation corresponding to the location obtained by the specifying. This orientation is such an orientation that the display is not upside down (is upright), for example, when viewed from the operator, regardless of whether the location is the "right" or the "left" (see FIG. 6). According to the present exemplary embodiment, space and cost for adding a component, such as a switch and a sensor, when changing of the orientation is performed, are not necessary. Therefore, for example, an operation apparatus advantageous in setting of an orientation of the display on the display unit can be provided. In addition, in a case where at least one of the port information and the device information from the lens apparatus 200 cannot be obtained (the location of the operation apparatus cannot be specified), a predetermined orientation can be determined as the orientation. The predetermined orientation is an orientation corresponding to the operation apparatus location="right", in the example in FIG. 4. Failure of the operation of the operation apparatus can be thereby reduced. The predetermined orientation can be selectable. Moreover, the number and the locations of the connectors of the lens apparatus are not limited to those described above, as far as the number and the locations are suitable for decision of the location of the operation apparatus.

Figure 6:
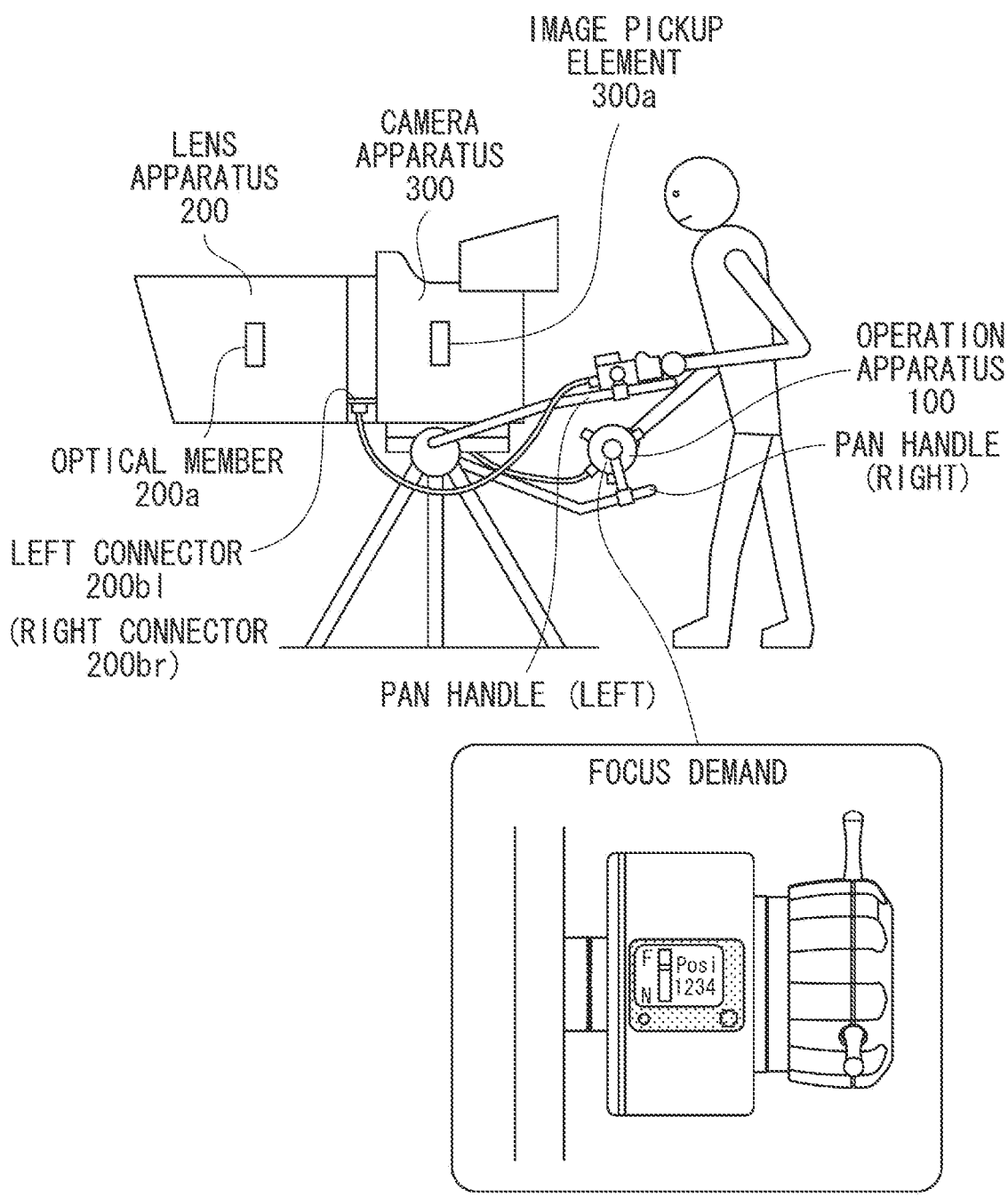
FIG. 6 is a diagram illustrating a configuration example of each of a system including a lens apparatus, and an image pickup apparatus.

Exemplary Embodiment According to System Including Lens Apparatus, and Image Pickup Apparatus FIG. 6 is a diagram illustrating a configuration example of each of a system including a lens apparatus, and an image pickup apparatus. This system includes the operation apparatus 100 described above as an example, and the lens apparatus 200. The lens apparatus 200 includes the movable optical member 200*a* to be operated by the operation apparatus 100, and a left connector 200*b*1 (a right connector 200*br* on the side opposite to the side where the left connector 200*b*1 is present). Further, the image pickup apparatus includes the operation apparatus 100 described above as an example, the lens apparatus 200, and a camera apparatus (an image pickup unit) 300 having an image pickup element 300*a* for receiving light (a light image) from the lens apparatus 200. In addition, the image pickup apparatus including the lens apparatus 200 can be supported by a support apparatus (e.g., a tripod). The support apparatus can include a pair of right and left handles (pan handles) for changing the orientation of the lens apparatus 200. The operation apparatus 100 can be disposed at either one of the pair of right and left handles. According to the present exemplary embodiment, for example, a system or image pickup apparatus advantageous in terms of operability of the operation apparatus can be provided.

Desirable exemplary embodiments of the present disclosure have been described above. However, the present disclosure is not limited to each of these exemplary embodiments, and can be variously modified in the scope without departing from the idea of the present disclosure.

Other Embodiments

Embodiments) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-195483, filed Oct. 5, 2017, which is hereby incorporated by reference herein in its entirety.

What is claimed is:

1. An operation apparatus that has an operation member and generates a command for controlling driving of a movable optical member in a lens apparatus based on an operation amount of the operation member, the operation apparatus comprising:
a display configured to display information; and
a processor configured to specify a location of the operation apparatus relative to the lens apparatus based on information on a relation between a direction of an operation of the operation member and a direction of driving of the optical member,
wherein the processor is configured to cause the display to perform display with an orientation corresponding to the specified location.

2. The operation apparatus according to claim 1, wherein the processor is configured to obtain information of the direction of the driving of the optical member from the lens apparatus.

3. The operation apparatus according to claim 1, wherein the processor is configured to cause the display to perform the display such that the performed display is not upside downed in the specified location.

4. The operation apparatus according to claim 1, wherein the processor is configured to set, as the orientation, a predetermined orientation in a case where the processor cannot specify the location.

5. The operation apparatus according to claim 1, wherein the processor is configured to set, as the orientation, a predetermined orientation, in place of the corresponding orientation, based on an input of an operator.

6. A system comprising:
a lens apparatus including a movable optical member; and
an operation apparatus of claim 1 for the movable optical member.

7. An image pickup apparatus comprising:
a system comprising:
a lens apparatus including a movable optical member, and
an operation apparatus of claim 1 for the movable optical member; and
an image pickup element configured to receive light from the lens apparatus in the system.

8. An operation apparatus that has an operation member and generates a command for controlling driving of a movable optical member in a lens apparatus based on an operation amount of the operation member, the operation apparatus comprising:
a display configured to display information; and
a processor configured to specify a location of the operation apparatus relative to the lens apparatus based on information of a communication connector of the lens apparatus to which the operation apparatus is connected,
wherein the processor is configured to cause the display to perform display with an orientation corresponding to the specified location.

9. The operation apparatus according to claim 8, wherein the processor is configured to obtain information of a port corresponding to the communication connector and information of a device connected to the port from the lens apparatus, and obtain, based on the obtained information of the port and the obtained information of the device, the information of the communication connector to which the operation apparatus is connected.

10. A system comprising:
a lens apparatus including a movable optical member; and
an operation apparatus of claim 8 for the movable optical member.

11. An image pickup apparatus comprising:
a system comprising:
a lens apparatus including a movable optical member, and
an operation apparatus of claim 8 for the movable optical member; and
an image pickup element configured to receive light from the lens apparatus in the system.

12. An operation apparatus that has an operation member and generates a command for controlling driving of a movable optical member in a lens apparatus based on an operation amount of the operation member, the operation apparatus comprising:
- a display configured to display information; and
- a processor configured to specify a location of the operation apparatus relative to the lens apparatus, the processor being configured to specify, as the location, which of right and left handles, used to change an orientation of the lens apparatus, to locate the operation apparatus on,
- wherein the processor is configured to cause the display to perform display with an orientation corresponding to the specified location.

13. The operation apparatus according to claim 12, wherein the processor is configured to specify, as the location, which of the right and left handles, arranged on a supporter for supporting the lens apparatus, to locate the operation apparatus on.

14. The operation apparatus according to claim 13, wherein the processor is configured to specify, as the location, which of the right and left handles, arranged on the supporter for supporting a camera apparatus connected to the lens apparatus, to locate the operation apparatus on.

15. A system comprising:
- a lens apparatus including a movable optical member; and
- an operation apparatus of claim 12 for the movable optical member.

16. An image pickup apparatus comprising:
- a system comprising:
- a lens apparatus including a movable optical member, and
- an operation apparatus of claim 12 for the movable optical member; and
- an image pickup element configured to receive light from the lens apparatus in the system.

\* \* \* \* \*